(12) United States Patent
Kobayashi et al.

(10) Patent No.: US 7,288,496 B2
(45) Date of Patent: Oct. 30, 2007

(54) ALUMINUM NITRIDE SINTERED BODY AND METHOD OF EVALUATION FOR THE SAME

(75) Inventors: Yoshimasa Kobayashi, Nagoya (JP); Toru Hayase, Nagoya (JP); Naohito Yamada, Kasugaii (JP)

(73) Assignee: NGK Insulators, Ltd., Nagoya City (JP)

( * ) Notice: Subject to any disclaimer, the term of this patent is extended or adjusted under 35 U.S.C. 154(b) by 433 days.

(21) Appl. No.: 10/871,351

(22) Filed: Jun. 18, 2004

(65) Prior Publication Data
US 2005/0013761 A1   Jan. 20, 2005

(30) Foreign Application Priority Data
Jun. 19, 2003 (JP) .......................... P2003-175391
May 25, 2004 (JP) .......................... P2004-155179

(51) Int. Cl.
*C04B 35/581* (2006.01)

(52) U.S. Cl. .................. 501/98.4; 279/128; 219/548

(58) Field of Classification Search ............... 501/98.4, 501/98.6; 219/548; 279/128
See application file for complete search history.

(56) References Cited

U.S. PATENT DOCUMENTS

| | | | | |
|---|---|---|---|---|
| 5,508,240 A | * | 4/1996 | Komatsu et al. | 501/98.2 |
| 5,677,253 A | * | 10/1997 | Inoue et al. | 501/98.5 |
| 5,874,378 A | * | 2/1999 | Ishida et al. | 501/98.4 |
| 6,225,249 B1 | * | 5/2001 | Fujita et al. | 501/98.4 |
| 6,403,510 B1 | * | 6/2002 | Kuibira et al. | 501/98.5 |
| 6,800,576 B2 | * | 10/2004 | Katsuda et al. | 501/98.4 |

FOREIGN PATENT DOCUMENTS

| | | |
|---|---|---|
| JP | 2002-164422 A1 | 6/2002 |
| JP | 2002-170870 A1 | 6/2002 |

* cited by examiner

*Primary Examiner*—Karl Group
(74) *Attorney, Agent, or Firm*—Burr & Brown

(57) ABSTRACT

An aluminum nitride sintered body is provided, including a polycrystalline structure in which grain boundary fracture toughness $K_{IC}^{gb}$ is 1.6 MPa·m$^{1/2}$ or more. The grain boundary fracture toughness $K_{IC}^{gb}$ is determined by the equation $K_{IC}^{gb} = K_{IC} \cdot \cos^2(\pi \cdot PIF/200)$, wherein $K_{IC}$ is fracture toughness (MPa·m$^{1/2}$), and PIF is a percentage of the intergranular fracture (%).

11 Claims, 3 Drawing Sheets

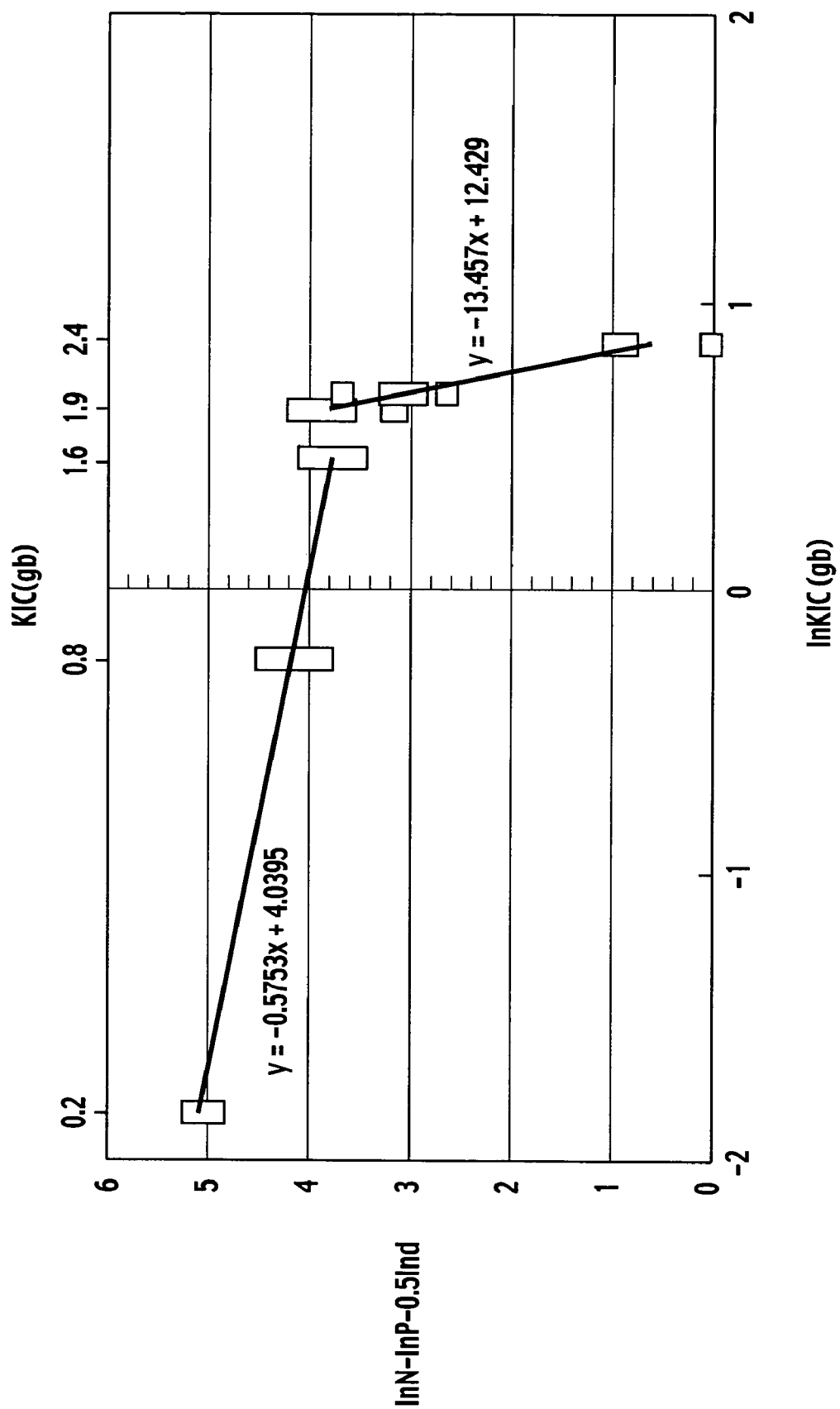

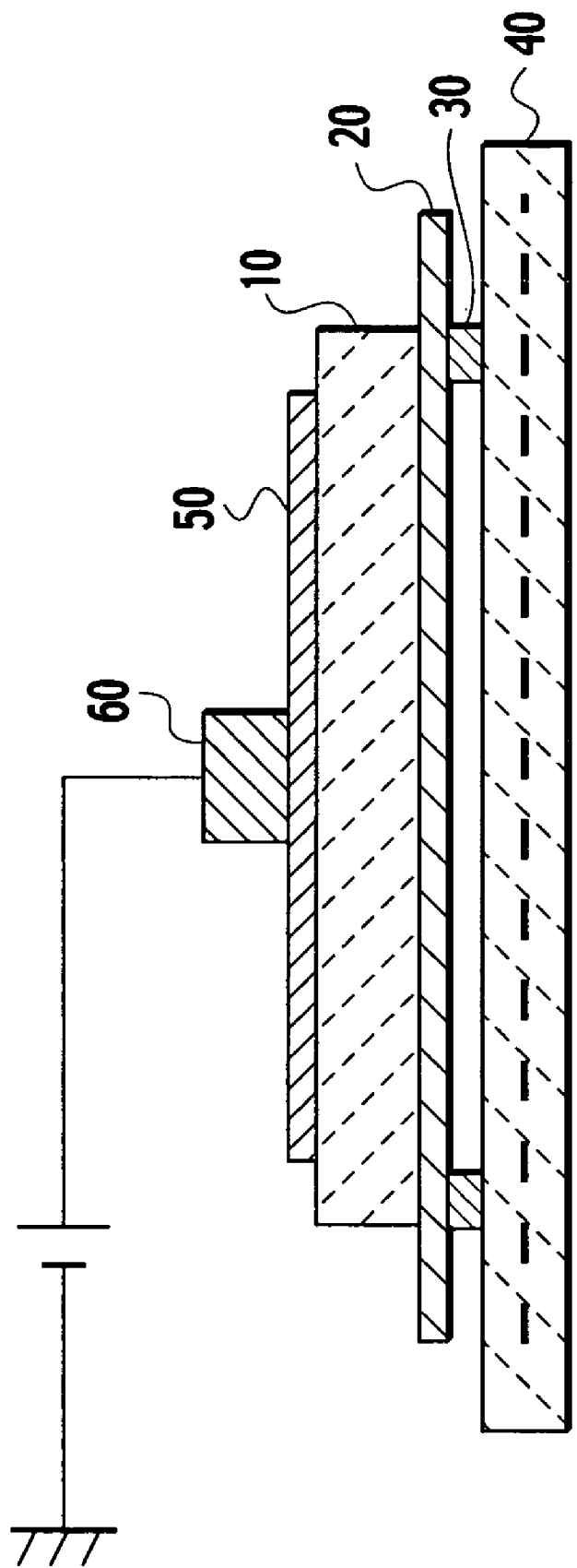

ALUMINUM NITRIDE SINTERED BODY AND METHOD OF EVALUATION FOR THE SAME

CROSS REFERENCE TO RELATED APPLICATION

This application is based upon and claims the benefit of priority from prior Japanese Patent Applications No. 2003-175391, filed on Jun. 19, 2003 and No. 2004-155179, filed on May 25, 2004, the entire contents of which are incorporated herein by reference.

BACKGROUND OF THE INVENTION

1. Field of the Invention

The present invention relates to a ceramic sintered body and, more particularly, to an aluminum nitride sintered body, a method of manufacturing the same, and a method of evaluation for the same.

2. Description of the Related Art

Conventionally, since ceramic sintered bodies have heat-resistance and corrosion-resistance properties as well as high strength, the ceramic sintered bodies are used in various fields where these properties can be applied. Among the ceramic sintered bodies, an aluminum nitride (AlN) sintered body has oxidation resistance and high thermal conductivity, and is therefore widely used for an electrostatic chuck for holding a wafer, a ceramic heater for heating a wafer, or other purposes.

However, in a case of an electrostatic chuck or a ceramic heater on which a wafer is mounted, it has been pointed out that dropping of ceramic grains occurs due to a thermal shock generated when the wafer is heated to high temperature, a mechanical shock generated when the wafer is attracted or released, abrasion caused by the thermal expansion of the wafer, or the like. Dropped ceramic grains may get into the interface between the ceramic sintered body and the wafer, hinder the adhesion of the ceramic sintered body and the wafer, and degrade the temperature uniformity of the wafer. Moreover, if dropped ceramic grains adhere to the back face of a semiconductor wafer, the ceramic grains may be carried together with the wafer when the wafer is carried in/out, and may fall onto the surface of another wafer. These ceramic grains may cause a wire break or a short circuit in a wiring pattern during a photolithography process, and may lead to a decrease in yield in semiconductor processes.

In addition, many AlN sintered body products are generally subjected to surface grinding and polishing. In cases of conventional AlN sintered bodies, however, dropping of ceramic grains often occurs when a face of a product is ground or polished, because of a mechanical shock and abrasion generated on the grinded or polished face. Since such dropping of ceramic grains creates surface irregularity on a polished face, the surface roughness of the polished face cannot be sufficiently reduced even after the face has been polished for a long time. Therefore, it is difficult to achieve a mirror finish on the polished face.

For the problems concerning the dropping of ceramic grains in an electrostatic chuck or a ceramic heater, a ceramic substrate is proposed which prevents ceramic grains from dropping from a ceramic sintered body (Japanese Patent Publication Nos. 2002-164422 and 2002-170870). These publications disclose that, to prevent the dropping of ceramic grains, it is preferable that a ceramic sintered body exhibits a characteristic of transgranular fracture rather than a characteristic of intergranular fracture.

When fracture occurs in a ceramic sintered body, however, it simply depends on the strength ratio of a ceramic grain to a grain boundary, whether the transgranular fracture mainly occurs or the intergranular fracture mainly occurs. Therefore, even a material which mainly allows transgranular fracture cannot prevent the dropping of ceramic grains if the intergranular strength is not sufficiently high. That is, unless intergranular bonding is stronger than an applied impact, stress or the like, even a material which mainly allows transgranular fracture cannot prevent grain dropping. In addition, since the dropping of ceramic grains mainly depends on the occurrence of cracks at grain boundaries, it is preferable that the intergranular strength, representing the resistance to grain dropping, is expressed as the resistance to the generation and growth of cracks.

On the other hand, evaluation of intergranular strength is not generally performed on ceramics. There is no example in which intergranular strength is evaluated in relation to the dropping of ceramic grains, particularly for an aluminum nitride sintered body. In addition, there are various methods of measuring the strength of ceramics. It is desired to use a proper and practical evaluation method in accordance with the purpose of preventing the dropping of ceramic grains.

SUMMARY OF THE INVENTION

An object of the present invention is to provide an aluminum nitride sintered body capable of effectively preventing the dropping of ceramic grains, a method of manufacturing the aluminum nitride sintered body, and, for the purpose of obtaining this sintered body, a method of evaluation for an aluminum nitride sintered body having a good correlation with the dropping of ceramic grains.

An aluminum nitride sintered body according to a first aspect of the present invention includes an aluminum nitride polycrystalline structure in which the grain boundary fracture toughness $K_{IC}^{gb}$ represented by an equation (1) below, is 1.6 (MPa·m$^{1/2}$) or larger, more preferably 1.9 (MPa·m$^{1/2}$) or larger:

$$K_{IC}^{gb}=K_{IC}\cdot\cos^2(\pi\cdot PIF/200) \qquad (1)$$

where $K_{IC}$ is fracture toughness (MPa·m$^{1/2}$), and PIF is percentage of an intergranular fracture (%).

A method of manufacturing the above mentioned aluminum nitride sintered body according to a second aspect of the present invention includes fabricating a raw mixed powder including aluminum nitride powder and yttria powder, fabricating a compact by forming a body from the raw mixed powder, and firing the compact at 1700° C. to 1900° C.

A method of evaluating an aluminum nitride sintered body according to a third aspect of the present invention includes measuring the fracture toughness $K_{IC}$ (MPa·m$^{1/2}$) of the aluminum nitride sintered body, measuring a percentage of the intergranular fracture PIF (%), and determining the grain boundary fracture toughness $K_{IC}^{gb}$ using the measured fracture toughness $K_{IC}$ (MPa·m$^{1/2}$) and the percentage of the intergranular fracture PIF (%), based on the equation (1) below. Note that any of the fracture toughness and the percentage of the intergranular fracture can be measured first:

$$K_{IC}^{gb}=K_{IC}\cdot\cos^2(\pi\cdot PIF/200) \qquad (1)$$

BRIEF DESCRIPTION OF THE DRAWINGS

FIG. 2 is a graph showing the relationship between the intergranular fracture toughness value and the standard value of intergranular crack frequency.

FIG. 3 is a schematic diagram of a configuration of a measuring system, showing a method of a particle test.

DETAILED DESCRIPTION OF THE INVENTION

Figure 1:
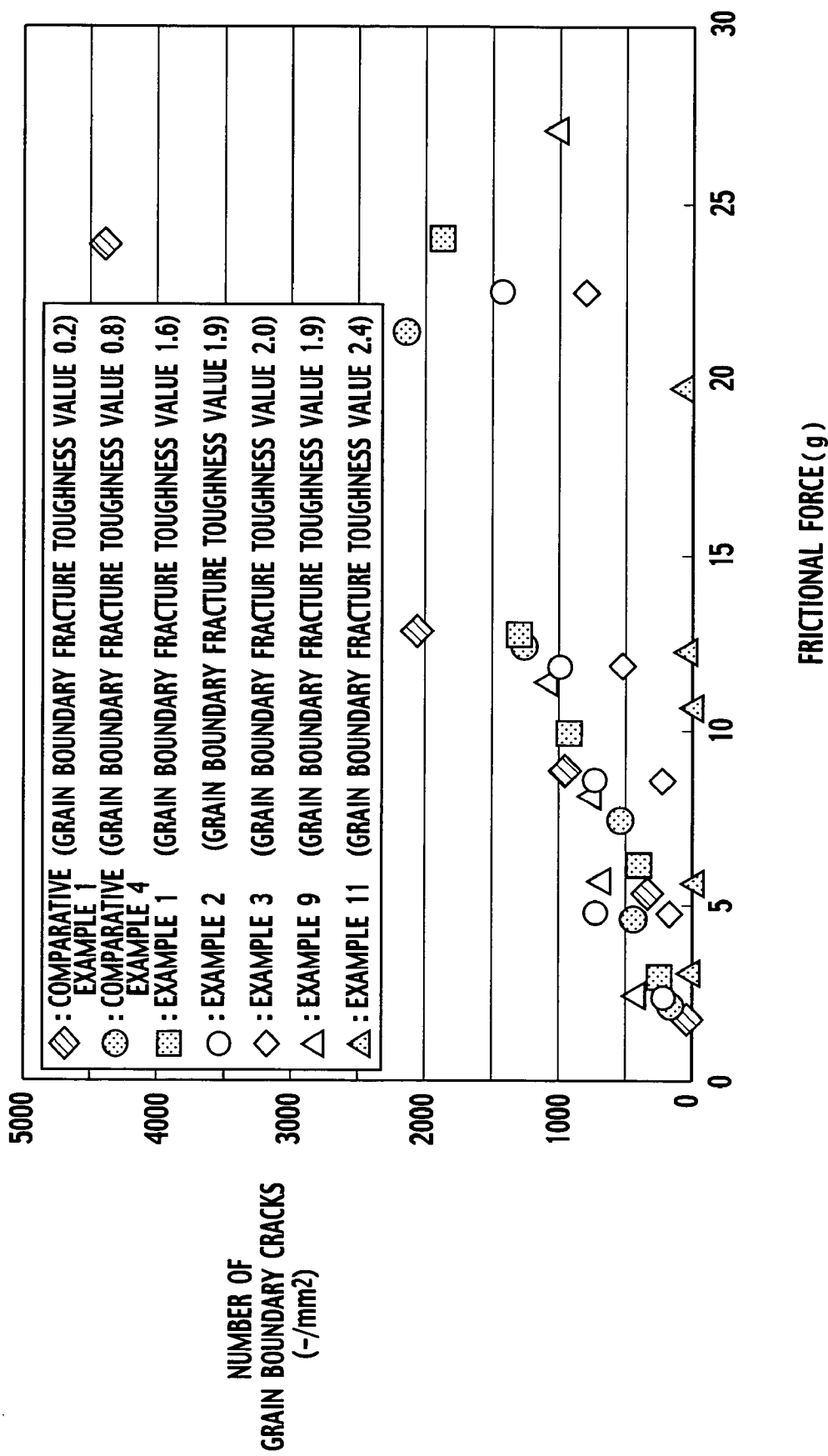
FIG. 1 is a graph showing the relationships between frictional force and the number of intergranular cracks, obtained through pin-on-disk tests.

An aluminum nitride sintered body according to one embodiment of the present invention is a ceramic sintered body having a structure in which the dropping of crystal grains (i.e. falling crystal grains from a sintered polycrystalline body) is effectively prevented. The aluminum nitride sintered body can be used for various purposes including a product on a main surface of which a wafer will be mounted, such as an electrostatic chuck, heater, or susceptor for use in semiconductor manufacturing processes, or in inspection processes for a variety of wafers and the like, as a precision part which needs grinding or polishing, as a substrate (wafer) as a mold material, and as a low-friction member, for example.

The dropping of crystal grains (hereinafter, referred to as grain dropping) from an aluminum nitride sintered body occurs mainly due to intergranular cracks. Therefore, to prevent grain dropping effectively, it is important that grain boundary strength show a predetermined value or more to reduce intergranular crack frequency, regardless of whether transgranular strength is high or low.

Although various measurement methods are used to measure the strength of a ceramic sintered body, there are not many examples of measurement of grain boundary strength or toughness. In particular for an aluminum nitride sintered body, there is no example in which the grain boundary fracture toughness is investigated in relation to the grain dropping. As a result of research on an evaluation method using grain boundary fracture toughness that is represented by the undermentioned equation (1), the present inventors have discovered that there is an extremely high correlation between the grain boundary fracture toughness and the intergranular crack frequency, which is directly attributable to grain dropping. Accordingly, it has been found that an aluminum nitride sintered body which is capable of effectively preventing grain dropping can be provided by using values of this grain boundary fracture toughness as the indices of evaluation. The aluminum nitride sintered body and the method of evaluation for the same according to this embodiment have been accomplished based on these findings.

$$K_{IC}^{gb} = K_{IC} \cos^2\left(\frac{\pi}{2} \cdot \frac{PIF}{100}\right) \qquad (1)$$

where $K_{IC}$ is fracture toughness (MPa·m$^{1/2}$), and PIF is the percentage of an intergranular fracture (%).

Hereinafter, a further specific description will be given of the evaluation method according to this embodiment, using the grain boundary fracture toughness value $K_{IC}^{gb}$, and the aluminum nitride sintered body according to this embodiment, obtained based on the evaluation method.

Here, the fracture toughness value $K_{IC}$ of a ceramic sintered body is a value, in general, measured as one of material physical properties and is an amount representing a stress field, at a crack tip, required to propagate a crack introduced in the ceramic sintered body in an opening mode. More precisely, the value is a critical stress intensity factor. Meanwhile, as shown in the above equation (1), the grain boundary fracture toughness value $K_{IC}^{gb}$ can be determined by multiplying the fracture toughness value $K_{IC}$ of a sintered body by a value $\cos^2(\pi \cdot PIF/200)$ including the percentage of the intergranular fracture PIF.

The above equation (1) is based upon an expression derived from a hypothesis, in a study of the fracture of alumina sintered bodies, that a deflection angle of a crack is determined depending on the ratio of transgranular fracture toughness to grain boundary fracture toughness and that there is a certain specific relationship between the slope of a grain boundary and the percentage of the intergranular fracture (A. Krell, et al., PHILOSOPHICAL MAGAZINE A, Vol. 51, No. 5, pp. 765-776 (1985)). Note that in the expression according to A. Krell, et al., used is a transgranular fracture toughness value $K_{IC}^1$ is used, not the fracture toughness value $K_{IC}$. Although it is preferable to use the transgranular fracture toughness value from an academic point of view, it is generally difficult to directly measure transgranular fracture toughness $K_{IC}^1$. Therefore, in the calculation of the grain boundary fracture toughness value according to this embodiment, from a practical point of view, the measurable fracture toughness value $K_{IC}$ of a sintered body is used instead of the transgranular fracture toughness value $K_{IC}^1$.

To measure the grain boundary fracture toughness value $K_{IC}^{gb}$, first, the fracture toughness value $K_{IC}$ of an aluminum nitride sintered body is measured. A method of measuring the fracture toughness value of a sintered body is not particularly limited, and any of various methods can be employed, including an Indentation-Fracture method (IF method), a notched beam method, a chevron notch method, a controlled surface flaw method, a single-edge precracked beam method, etc. When the IF method is used, for example, in conformity with the conditions prescribed by JIS R 1607 (1995), Vickers hardness is determined by using a Vickers diamond indenter, and the lengths of cracks occurring from an indentation are also measured. Then, the fracture toughness value $K_{IC}$ is calculated by using the following equation (2):

$$K_{IC} = 0.018(E/HV)^{1/2}(P/(C^{3/2})) \qquad (2)$$
$$= 0.026(E^{1/2}P^{1/2}a)/C^{3/2}$$

where E is an elastic modulus (Pa), HV is a Vickers hardness value (Pa), P is a load (N), C is half an average of the crack lengths (m), and a is half an average of the lengths of diagonal lines across an indentation.

Next, the percentage of the intergranular fracture PIF is determined by measuring the length of each of the cracks, occurring from a corner of the indentation, which pass along grain boundaries and through grains, and by calculating a percentage of the length of a crack passing along grain boundaries to the total length of all the cracks. For example, when the grain boundary fracture toughness is measured by using the IF method, cracks formed from an indentation, which is made on a ceramic sintered body using a Vickers diamond indenter, are observed using a SEM or the like. The lengths of the cracks passing through grains and along grain boundaries are individually measured, and then the percentage of the intergranular fracture PIF can be determined by calculating a value=100×(length of a crack passing along grain boundaries)/(total length of all cracks).

The dropping of grains from an aluminum nitride sintered body directly results mainly from intergranular cracks. Therefore, it can be thought that grain dropping frequency depends on the number N of intergranular cracks. Accordingly, if the number N of intergranular cracks can be reduced, the grain dropping frequency decreases spontaneously. In the case of the grain dropping of a ceramic sintered body, such as an electrostatic chuck or a heater, for use in a semiconductor manufacturing device or inspection device, it is pointed out that the grain dropping results from abrasion on the sintered body and a wafer due mainly to the thermal expansion of the wafer. For this reason, it must be possible to simulate states of the contact faces of a sintered body and a wafer by abrading a disk made of the material of the sintered body with a pin made of the material of the wafer through a pin-on-disk method or the like, and thereby to evaluate the occurrence of intergranular cracks and grain dropping frequency. The pin-on-disk method is a method in which a pin is slid on a disk, and a friction coefficient and abrasion wear at that time are measured. In addition, since the friction coefficient, the abrasion wear, and the degree of damage to a surface largely depend on the state of the surface, when comparing the friction coefficients and degrees of surface damage of some materials, it is preferable to make the surfaces of the materials have the same degree of roughness by polishing.

FIG. 1 is a graph showing the results of pin-on-disk tests performed on aluminum nitride sintered bodies. The dots plotted in the graph show values obtained by measuring aluminum nitride samples according to examples and comparative examples of the present invention, which will be described later. Note that the numbers in the brackets ( ) for the respective samples, shown top left in the graph, are grain boundary fracture toughness values $K_{IC}^{gb}$ determined based on the aforementioned equation (1). In this graph, the horizontal axis represents frictional force, and the vertical axis represents the number N of intergranular cracks. From these test results, the present inventors have obtained findings as follows:

1) As the frictional force increases, the number of intergranular cracks tends to increase substantially in direct proportion;

2) The higher the grain boundary fracture toughness value is, the smaller the number of intergranular cracks tends to be; and 3) The smaller grain diameter a material has, the smaller the number of intergranular cracks tends to be.

Based on these findings, the present inventors have derived the following equation (3):

$$N = A \cdot F \cdot d^{\alpha} \cdot (K_{IC}^{gb})^{\beta} \quad (3)$$

where A, $\alpha$ and $\beta$ are constants, F is frictional force (N), and d is a grain diameter (m).

Taking the logarithm of both sides of the above equation (3) and rearranging it gives the following equation:

$$lnN - lnF - \alpha lnd = \beta lnK_{IC}^{gb} + lnA$$

From this equation, assuming that ($lnN-lnF-\alpha lnd$) is Y and $lnK_{IC}^{gb}$ is X, the constants $\beta$ and A can be determined by a least-squares method. As for the constant $\alpha$, −1, −0.5, 0, 0.5, and 1 are individually substituted for $\alpha$, and then the constant $\alpha$ is determined to be 0.5 as the value that makes the correlation coefficient the largest. Based on this value, the standard value of the intergranular crack frequency is determined to be $N/(F \cdot d^{0.5})$, and then the relationship between this standard value and the grain boundary fracture toughness value is examined. The result is shown in FIG. 2. The horizontal axis represents the grain boundary fracture toughness value $lnK_{IC}^{gb}$, and the vertical axis represents the standard value of the intergranular crack frequency, ($lnN-lnF-0.5lnd$), that is, the logarithm of $N/(F \cdot d^{0.5})$. Note that, as described above, this standard value ($lnN-lnF-0.5lnd$) of the intergranular crack frequency corresponds to the grain dropping frequency.

As can be seen in FIG. 2, there is a high correlation between the grain boundary fracture toughness value and the intergranular crack frequency. It is found that although the intergranular crack frequency decreases with an increase in the grain boundary fracture toughness value, the trend of this correlation greatly changes around a grain boundary fracture toughness value $K_{IC}^{gb}$ of 1.6 to 1.9 (MPa·m$^{1/2}$), making this range a critical boundary. That is to say, in a region where the grain boundary fracture toughness value $K_{IC}^{gb}$ is not more than 1.6 (MPa·m$^{1/2}$), the intergranular crack frequency gently decreases with an increase in the grain boundary fracture toughness value, but in a region where the grain boundary fracture toughness value $K_{IC}^{gb}$ is not less than 1.9 (MPa·m$^{1/2}$), the intergranular crack frequency dramatically decreases with an increase in the grain boundary fracture toughness value. Each of these decreases exhibits a linear change, and the following relationships are given for the respective regions.

$$K_{IC}^{gb} \leq 1.6(MPa \cdot m^{1/2}): N = 57Fd^{0.5}K_{IC}^{gb-0.58}$$

$$K_{IC}^{gb} \geq 1.9(MPa \cdot m^{1/2}): N = 2.5 \times 10^5 Fd^{0.5}K_{IC}^{gb-13}$$

Based on the above results, the present inventors have found that the dropping of grains from an aluminum nitride sintered body can be effectively prevented if an aluminum nitride sintered body is fabricated with a grain boundary fracture toughness value $K_{IC}^{gb}$ equal to or more than the above-described critical value.

As described above, for the prevention of the grain dropping of ceramics, it is extremely effective to evaluate the grain boundary fracture toughness value. The aluminum nitride sintered body according to this embodiment has been discovered based upon the foregoing findings, and is an aluminum nitride sintered body of which the grain boundary fracture toughness value is 1.6 (MPa·m$^{1/2}$) or larger, preferably 1.9 (MPa·m$^{1/2}$) or larger, and more preferably 2.4 (MPa·m$^{1/2}$) or larger.

Note that the aluminum nitride sintered body according to this embodiment, which meets the above-described conditions of the grain boundary fracture toughness value, is characterized by including a YAG phase in the grain boundaries or including Si in the sintered body. Upon measuring diffraction patterns of the aluminum nitride sintered body using an X-ray diffraction method, the aluminum nitride sintered body in particular including the YAG phase will preferably exhibit a ratio of the peak intensity of a YAG crystal at a (211) plane to the peak intensity of an aluminum nitride crystal at a (100) plane, ($I_{YAG}/I_{AlN}$), of 0.03 or more.

Method of Manufacturing Aluminum Nitride Sintered Body

Next, a description will be given of a method of manufacturing the aluminum nitride sintered body according to this embodiment. First, aluminum nitride raw powder and raw powder of a sintering aid such as yttria ($Y_2O_3$), silica (SiO$_2$), or alumina (Al$_2$O$_3$) are mixed at a predetermined ratio, which will be described later, and blended by using a pot mill, a ball mill or the like. The blending can be performed by wet blending or dry blending. When the wet blending is used, the mixture is dried after the blending, thus obtaining a raw mixed powder.

Subsequently, forming is performed using the raw mixed powder as it is or after subjected to size enlargement with an addition of a binder, thereby obtaining a compact in a shape of a disc or the like. The forming method is not particularly limited, and any of various methods can be employed, including, for example, molding, CIP (Cold Isostatic Pressing), slip casting, etc. Further, the compact is fired at 1700° C. to 1900° C. by hot pressing, pressureless sintering, or the like, thus fabricating a sintered body. Thereafter, grinding and polishing are performed if required.

Note that, when an electrostatic chuck or a heater is fabricated, a predetermined electrode is embedded in the raw mixed powder in the forming process. For example, in a case of an electrostatic chuck, it is desirable that a planar electrode with a punched pattern, made of a metal bulk body, or more preferably a mesh (wire mesh) electrode, is embedded in the raw material powder. Moreover, in a case of a heater, a resistance heating element electrode, made of a metal bulk body processed into a predetermined form such as coil or spiral, is embedded similarly to the case of the electrostatic chuck. For any of the electrodes, it is preferable to use a high-melting point metal, for example, Mo, W, etc. Note that, when an electrode made of a metal bulk body is used, the employment of a hot press sintering process, where uni-axial pressurization is performed while firing, can enhance the adhesion of the electrode and the aluminum nitride sintered body.

Note in addition that, for an electrode of an electrostatic chuck, a film electrode may be also used which is formed by printing a metal paste, drying and firing the printed metal paste. In this case, a green sheet laminate may be fabricated in the forming process, for example, two discoid green sheets, printing a metal electrode in a paste form onto a surface of one of the green sheets, and laminating the other to the green sheet with the printed electrode, with the electrode interposed therebetween. Then, this green sheet laminate may be fired.

In the above-described manufacturing method according to this embodiment, commercially-available reduced nitride powder is preferably used as the aluminum nitride raw powder used in the mixing process. However, the method of fabricating the powder is not particularly limited, and it is also possible to use powder obtained by reduction nitriding, direct nitriding, gas-phase synthesis from aluminum alkyl, or the like. For the yttria raw powder, commercially-available yttria powder can be used. It is, however, also possible to use yttria obtained by heating yttrium nitrate, yttrium sulfate, yttrium oxalate, or the like. For the Si source, silica, silicon, silicon nitride, or the like can be used. For the silica raw powder, for example, quartz glass powder can be used. It is, however, also possible to use silica obtained by heating tetraethoxysilane or the like. For the alumina raw powder, commercially-available aluminum oxide powder can be used. It is, however, also possible to use alumina obtained by heating aluminum nitrate, aluminum sulfate, or the like. Alternatively, instead of adding the raw powder, it is also possible to adjust an aluminum oxide content by oxidation of AlN powder.

In order to obtain the aluminum nitride sintered body according to this embodiment, which has a grain boundary fracture toughness value $K_{IC}^{gb}$ of 1.6 (MPa·m$^{1/2}$) or more, it is preferable that a YAG (Y$_3$Al$_5$O$_{12}$) phase is formed at the grain boundaries, or that Si is included in the sintered body. The type of a crystalline phase precipitated at an intergranular phase can be controlled with the kind of a sintering aid and the mixing ratio when the aluminum nitride powder and the sintering aid are mixed in the process of mixing the raw powders.

If only yttria is added as the sintering aid, yttria powder is added with a weight 0.5 to 1.4 times the weight of an amount of alumina which is calculated based on the amount of oxygen contained in the aluminum nitride raw powder. With this weight ratio, a YAG phase can be formed at the grain boundaries. Note that if yttria is added at a weight ratio of 1.5 or above, a YAL (YAlO$_3$) phase is more easily formed instead of the YAG phase, and further at a weight ratio of 2.7 or above, a YAM phase (Y$_4$Al$_2$O$_9$) is more easily formed instead of the YAL phase. In any case, the grain boundary fracture toughness value decreases in comparison with the case where the YAG phase is formed.

Moreover, it is also possible to further add alumina as the sintering aid in addition to the above-mentioned yttria. In this case, the YAG-phase content of the sintered body can be increased, and the sintered body having still higher grain boundary fracture toughness can be achieved. For example, the weight ratio of the sum of alumina powder to be added and the weight of an amount of alumina which is calculated based on the amount of oxygen contained in the aluminum nitride powder, to yttria powder to be added is set to 0.5.1 to 1.4:1. Moreover, the total amount of the sintering aids composed of the yttria and alumina, which will be added to aluminum nitride powder, is set to 2 to 20 parts by weight with respect to 100 parts by weight of the aluminum nitride powder. With these proportions, a YAG phase can be effectively formed at the intergranular phase Furthermore, if only silica is added as the sintering aid to the aluminum nitride powder, Si is contained in the sintered body. In this case as well, a high grain boundary fracture toughness value can be achieved, as in the case where a YAG phase is formed. For example, adding 0.4 parts by weight or more of silica to 100 parts by weight of the aluminum nitride powder can result in a grain boundary fracture toughness value of 1.6 (MPa·m$^{1/2}$) or more, and adding one part by weight or more of silica alone can result in a grain boundary fracture toughness value of 1.9 (MPa·m$^{1/2}$) or more. For the Si source, silicon, silicon nitride, or the like can be also used in place of silica. If both silica and yttria are added, a YAG phase is easily formed at the intergranular phases, and further, Si is contained in the sintered body. Accordingly, due to the complex effects thereof, a high grain boundary fracture toughness value of 1.6 (MPa·m$^{1/2}$) or more can be easily achieved. For example, a YAG phase can be formed at the grain boundaries when the mixing ratio of the weight of silica powder to the weight of yttria powder is set to 0:1 to 30:1, and when the total amount of the sintering aids including the added yttria and alumina, which will be added to the aluminum nitride powder, is set to 0.5 to 10 parts by weight with respect to 100 parts by weight of the aluminum nitride powder.

When the aluminum nitride sintered body according to this embodiment is used as an electrostatic chuck or a heater, it is possible to prevent the grain dropping of the aluminum nitride sintered body, which conventionally occurs, for example, due to mechanical shocks in attracting/releasing of a wafer or due to the friction between a wafer and the sintered body attributable to a difference in thermal expansion. Accordingly, it is possible to reduce wire breaks and short circuits in a pattern caused by the influence of particles generated due to the grain dropping, in a photolithography process, and thus to greatly increase the yield of semiconductor processes.

In addition, when the aluminum nitride sintered body according to this embodiment is used as an above-mentioned electrostatic chuck or heater, or for other uses such as precision parts, mold material, and low-friction members, grinding and/or polishing is performed on the surface of a product as required. In this process, since the dropping of aluminum nitride grains can be effectively prevented, it is possible to lower the surface roughness of the polished face to a desired value. In particular when a mold member or a low-friction member is fabricated, the use of the aluminum nitride sintered body according to this embodiment can facilitate making a face to be in direct contact with molded material or to be in contact with another part, the face being desired to be mirror-finished, a mirror face with a surface roughness Ra of 50 nm or less, or more preferably 40 nm or less.

EXAMPLES

Now, a description will be given below of Examples 1 to 12 of the present invention and Comparative Examples 1 to 5.

Manufacturing Conditions

In Examples 1 to 12 of the present invention and Comparative Examples 1 to 5, raw powders of aluminum nitride, yttria, alumina, and silica were mixed at respective mixing ratios shown in Table 1. For the aluminum nitride powder, the yttria powder, and the alumina powder, those commercially available were used. For the silica powder, quartz glass powder was used. In each example, isopropyl alcohol was added as a solvent to the mixed raw powder and then wet-blended for four hours by using a nylon pot and pebbles. After the blending, the slurry was taken out and dried at 110° C. The dried powder was further subjected to heat treatment in an air atmosphere at 450° C. for five hours, thereby burning off a nylon component that was mixed into the slurry during the wet blending. Thus, raw powder to be fired was obtained.

Next, the raw powder to be fired was formed into a body through uni-axial pressurization using a die to fabricate a compact in a shape of a disc 50 mm in diameter and 20 mm in thickness. Note that the pressure applied during the forming was 200 kgf/cm².

The obtained compact was housed in a graphite mold and hot-press sintered, thus obtaining a sintered body. For the conditions of the hot-press sintering process, the pressing pressure was 200 kgf/cm², and the firing temperature was 1800° C. After this firing temperature was maintained for four hours, the sintered body was cooled down. Note that the inside of a furnace was made to be a vacuum atmosphere when the temperature was from room temperature to 1000° C., and then, when the temperature was 1000° C. to 1800° C., a nitrogen gas was introduced into the furnace under a condition of 15 kgf/cm² to make the inside thereof a nitrogen atmosphere.

TABLE 1

|  | AlN raw powder (parts by weight) | $Y_2O_3$ raw powder (parts by weight) | $Al_2O_3$ raw powder (parts by weight) | $SiO_2$ raw powder (parts by weight) |
|---|---|---|---|---|
| Example 1 | 100 | 1 | 0 | 0 |
| Example 2 | 100 | 3 | 2.76 | 0 |
| Example 3 | 100 | 5 | 3.76 | 0 |
| Example 4 | 100 | 0 | 0 | 0.5 |
| Example 5 | 100 | 0 | 0 | 1 |
| Example 6 | 100 | 0 | 0 | 2 |
| Example 7 | 100 | 1.5 | 0 | 1 |
| Example 8 | 100 | 3 | 0 | 0.1 |
| Example 9 | 100 | 3 | 0 | 0.5 |
| Example 10 | 100 | 3 | 0 | 1 |
| Example 11 | 100 | 3 | 0 | 2 |
| Example 12 | 100 | 5 | 0 | 1 |
| Comparative Example 1 | 100 | 3 | 0 | 0 |
| Comparative Example 2 | 100 | 5 | 0 | 0 |
| Comparative Example 3 | 100 | 5 | 0.75 | 0 |
| Comparative Example 4 | 100 | 0 | 0 | 0 |
| Comparative Example 5 | 100 | 0.3 | 0 | 0 |

Evaluation Method

The following evaluations and tests are performed on the thus obtained aluminum nitride sintered body samples of the respective examples and comparative examples, under conditions which are described further below: (a) evaluation of grain boundary fracture toughness; (b) identification of a crystalline phase; (c) pin-on-disk test; (d) particle test; and (e) evaluation of a polished face.

(a) Method of Evaluating Grain Boundary Fracture Toughness:

To evaluate the grain boundary fracture toughness value $K_{IC}^{gb}$ of each sample, the fracture toughness value $K_{IC}$ and the percentage of the intergranular fracture PIF of each aluminum nitride sintered body were measured by the following method. First, for the fracture toughness value $K_{IC}$, measurement was made at five points on the main surface of each sample under conditions that the loading weight was 5 kg and the pressing time was 15 seconds by using a Vickers diamond indenter. Indentations formed at the measurement points were observed using a microscope under a condition of 200 to 300 times magnification, and the length of a diagonal line across each indentation and the lengths of diagonal lines of cracks were measured. Based on these measured values, the fracture toughness value $K_{IC}$ was calculated using the equation (2).

The percentage of the intergranular fracture PIF was determined in such a manner that the propagating lengths of cracks, which occurred at corners of an indentation introduced by means of the aforementioned Vickers diamond indenter and passed along grain boundaries and through grains, were measured, and then a value (100×(propagating length of a crack along grain boundaries)/(total length of all the cracks)) was calculated. This calculation was performed on three formed cracks for each sample, and the average value of the three values was made to be the percentage of the intergranular fracture PIF. The cracks were observed using a SEM with about 3000 to 8000 times magnification.

(b) Identification of Crystalline Phase:

The crystal structure of each sample was identified by X-ray diffraction (XRD). For the measuring conditions, CuKα radiation was used as an X-ray under conditions of 35 kV and 20 mA, and the measurement was performed in a 2

θ measurement range from 10° to 70°. Based on each diffraction pattern, the peak intensity ratio of each of YAG ($Al_5Y_3O_2$), YAL ($AlYO_3$) and YAM ($Al_2Y_4O_9$) crystals to an aluminum nitride crystal was measured. Note that the peak intensity ratios were calculated using the peak intensities of the respective crystals under the following conditions: aluminum nitride crystal: (100) plane around 2 θ=33.21°; YAG crystal: (211) plane around 2 θ=18.07°; YAL crystal: (220) plane around 2 θ=41.81°; and YAM crystal: (220) plane around 2 θ=18.86°.

(c) Pin-On-Disk Test:

In the pin-on-disk test, one side of each of the sintered bodies, cut off in a shape of ~40 mm×t3 mm, was grinded using a #400 diamond wheel. Thereafter, the grinded side of the sintered body was polished using Kemet copper plates with slurry of diamond (9 μm and 3 μm respectively) dropped thereon and a buff with slurry of silica (0.05 μm) dropped thereon, to obtain a mirror face. The thus obtained samples, each with a surface roughness (Ra) of 20 to 35 nm, were tested. The pin-on-disk test was performed on each sample by using a silicon pin with a diameter of 6 mm, at 360° C. in a vacuum. Five different loads (5 g, 10 g, 20 g, 40 g, 80 g) were applied, and the frictional force was measured for each load. After the test, in which the sliding speed was 0.4 mm/s and the sliding rotation was one, the surface in question of the tested sample was observed by using a SEM with 5000 times magnification at 50 fields of view, where the number of cracks occurring at grain boundaries was measured.

(d) Particle Test:

The particle test is conducted for evaluating the grain dropping properties of a material in such a manner that a Si wafer is attracted by using the sample of any one of the present examples and the comparative examples as an electrostatic chuck, and the number of aluminum nitride grains dropped on the Si wafer is measured. A method of the particle test is shown in FIG. 3. A plate ceramic heater 40 for regulating temperature was placed in a sealable chamber for measurement and test. A silicon wafer 20 was placed on the ceramic heater 40 with a spacer 30 interposed therebetween. An electrode for attraction and voltage-application, made of a conductive paste 50, was formed on the back face of an electrostatic chuck 10, which is any one of the samples of the present examples and the comparative examples. The electrostatic chuck 10 was then mounted on the silicon wafer 20 with an attracting face of the electrostatic chuck 10 facing down. The attracting face of each sample was polished in a similar way to that in the pin-on-disk test to obtain a surface roughness of 20 to 35 nm. The chamber started to be evacuated at room temperature, and the electrostatic chuck 10 (sample) was gradually heated using the ceramic heater 40 up to 400° C. in a vacuum state. At 400° C., the silicon wafer was attracted by the attracting face of the sample under conditions that an attraction voltage of 250 V was applied for one minute. Thereafter, the sample was cooled down to room temperature; the inside of the chamber was recovered to an atmospheric pressure; the sample is removed; and the attracted face of the silicon wafer 20 was observed, where the number of aluminum nitride grains (particles) dropped on the silicon wafer 20 was counted.

It was determined whether a particle was an aluminum nitride grain or a particle of another material, by performing EDS (Energy Dispersion Spectroscopy) analysis on all the particles. The number of particles was measured by using a SEM at two portions, center and end portions of the silicon wafer 20, each with an area of 4 $mm^2$. Further, based on the measured numbers, the number of particles in an area of 50 $mm^2$ was calculated (e) Evaluation of Polished Face:

Surfaces of the samples of Example 11 and Comparative Example 3 were polished, and the surface roughness (Ra) after polishing was measured for each. Specifically, one side of each of the aluminum nitride sintered body was grinded using a #400 diamond wheel and then polished using copper lapping plates with diamond slurries dropped thereon respectively. Here, the slurries contained diamond abrasive grains with diameters of 9 μm and 3 μm, respectively. The polishing conditions on Example 11 were that the processing pressure was 169 $g/cm^2$, and the processing time was 50 minutes. Moreover, the polishing conditions on Comparative Example 3 were that the processing pressure was 166 $g/cm^2$, and the processing time was 50 minutes.

Evaluation Results

For each of the examples and comparative examples, Table 2 shows the grain boundary fracture toughness value, the type or types of crystalline phase at intergranular phases, the peak intensity ratios of YAG, YAM and YAL crystals to an aluminum nitride crystal, and the number of particles measured in the particle test. Note that the results of the pin-on-disk tests are shown in FIG. 1, the relationship between the grain boundary fracture toughness value and the intergranular crack frequency, which has been standardized based on the results of the pin-on-disk tests, is shown in FIG. 2, and the evaluation of the polished faces is shown in Table 3.

Referring to the graph in FIG. 2, as already stated in the paragraph of the embodiment, in the case of the grain boundary fracture toughness value and the standard value of the intergranular crack frequency, the intergranular crack frequency exhibits a tendency to decrease as the grain boundary fracture toughness value increases. The intergranular crack frequency largely inclines around a grain boundary fracture toughness value of 1.6 to 1.9 ($MPa \cdot m^{1/2}$) and dramatically decreases with an increased grain boundary fracture toughness value of not less than 1.9 ($MPa \cdot m^{1/2}$).

On the other hand, in the particle tests as well, the numbers of particles of the samples of Example 1, having a grain boundary fracture toughness value of 1.6 ($MPa \cdot m^{1/2}$), and Example 11, having a grain boundary fracture toughness value of 2.4 ($MPa \cdot m^{1/2}$), were greatly reduced in comparison with those of the samples of Comparative Example 3, having a grain boundary fracture toughness value of 0.2 ($MPa \cdot m^{1/2}$), and Comparative Example 4, having a grain boundary fracture toughness value of 0.8 ($MPa \cdot m^{1/2}$). It has been confirmed from these results that it is effective to use the grain boundary fracture toughness value as an index of the evaluation aimed at preventing grain dropping.

In addition, in any of the samples with a grain boundary fracture toughness of 1.6 $MPa \cdot m^{1/2}$ or more, to which yttria was added, a YAG phase was formed at the grain boundaries. In each case, the peak intensity ratio regarding the YAG phase in the X-ray diffraction pattern was 0.03 or more.

TABLE 2

| | Intergranular fracture toughness $K_{IC}^{gb}$ (MPa·m) | Number of particles in area of 50 mm² (pieces) | Type of crystal in intergranular phase | $I_{YAG}/I_{AlN}$ Peak intensity ratio (-) | $I_{YAL}/I_{AlN}$ Peak intensity ratio (-) | $I_{YAM}/I_{AlN}$ Peak intensity ratio (-) |
|---|---|---|---|---|---|---|
| Example 1 | 1.6 | 92 | YAG | 0.03 | 0 | 0 |
| Example 2 | 1.9 | Not measured | YAG | 0.05 | 0 | 0 |
| Example 3 | 2.0 | Not measured | YAG | 0.06 | 0 | 0 |
| Example 4 | 1.7 | Not measured | SiAl$_7$O$_2$N$_7$ | 0 | 0 | 0 |
| Example 5 | 1.9 | Not measured | SiAl$_7$O$_2$N$_7$ | 0 | 0 | 0 |
| Example 6 | 2.1 | Not measured | SiAl$_7$O$_2$N$_7$ | 0 | 0 | 0 |
| Example 7 | 2.0 | Not measured | YAG SiAl$_7$O$_2$N$_7$ | 0.04 | 0 | 0 |
| Example 8 | 1.7 | Not measured | YAG SiAl$_7$O$_2$N$_7$ | 0.03 | 0 | 0 |
| Example 9 | 1.9 | Not measured | YAG SiAl$_7$O$_2$N$_7$ | 0.04 | 0 | 0 |
| Example 10 | 2.2 | Not measured | YAG SiAl$_7$O$_2$N$_7$ | 0.06 | 0 | 0 |
| Example 11 | 2.4 | 63 | YAG SiAl$_7$O$_2$N$_7$ | 0.07 | 0 | 0 |
| Example 12 | 1.9 | Not measured | YAG | 0.1 | 0 | 0 |
| Comparative Example 1 | 0.3 | Not measured | YAL | 0 | 0.02 | 0 |
| Comparative Example 2 | 0.1 | Not measured | YAL YAM | 0 | 0.01 | 0.03 |
| Comparative Example 3 | 0.2 | 222 | YAL YAM | 0 | 0.03 | 0.01 |
| Comparative Example 4 | 0.8 | 112 | Al$_5$O$_6$N | 0 | 0 | 0 |
| Comparative Example 5 | 1.1 | Not measured | YAG | 0.01 | 0 | 0 |

Further, as shown in Table 3, when the polished face of the sample of Example 11, having a grain boundary fracture toughness value of 2.4 (MPa·m$^{1/2}$), is compared with that of the sample of Comparative Example 3, having a grain boundary fracture toughness value of 0.2 (MPa·m$^{1/2}$), it has been confirmed that the polished face of the sample of Example 11, having a larger grain boundary fracture toughness value, can achieve a substantial mirror face with a surface roughness Ra of 40 nm or less. As the reason that a mirror face could be achieved only with diamond abrasive grains with a diameter of 3 µm, it can be thought that the reduction in the number of dropped grains during the grinding and polishing had the effect of lowering the surface roughness.

TABLE 3

| | Polishing pressure (g/cm²) | Polishing time (min) | Surface roughness Ra (nm) |
|---|---|---|---|
| Example 11 | 169 | 50 | 33 |
| Comparative Example 3 | 166 | 50 | 85 |

Although the present invention has been described above based on the embodiment and examples, the present invention is not limited to the description of the above embodiment or examples. When the aluminum nitride sintered body of the present invention is used as an electrostatic chuck or a ceramic heater, since grain dropping occurs mainly on a face in contact with a wafer, only the grain boundary fracture toughness values of the face in contact with the wafer and of the vicinity of the face may meet the value range according to the embodiment. Moreover, in the cases of aluminum nitride sintered body products for the other uses as well, only a portion required to be polished, or a portion to be in contact with another part, may be made to have a grain boundary fracture toughness value according to the embodiment.

It should be noted that the above-described embodiment and examples are for the purpose of illustration. Any of those which have substantially the same structure as those according to the technical ideas set forth in the scope of claims of the present invention, and which have similar operation and effects, are included in the technical scope of the present invention.

As described above, the aluminum nitride sintered body of a aspect of the present invention is characterized in that the grain boundary fracture toughness K$^{gb}_{IC}$ represented by the following equation (1), is 1.6 (MPa·m$^{1/2}$) or larger, more preferably 1.9 (MPa·m$^{1/2}$) or larger.

$$K_{IC}^{gb}=K_{IC}\cdot\cos^2(\pi\cdot PIF/200) \quad (1)$$

where K$_{IC}$ is fracture toughness (MPa·m$^{1/2}$), and PIF is a percentage of the intergranular fracture (%).

According to the characteristic of the aluminum nitride sintered body of the present invention, the frequency of occurrence of cracks at grain boundaries is greatly reduced in a range where the grain boundary fracture toughness K$^{gb}_{IC}$ is 1.6 (MPa·m$^{1/2}$) or larger, more preferably 1.9 (MPa·m$^{1/2}$) or larger. Therefore, it is possible to effectively prevent the dropping of aluminum nitride grains.

The aluminum nitride sintered body of the present invention having a YAG (Y$_3$Al$_5$O$_{12}$) phase at grain boundaries exhibits higher grain boundary fracture toughness compared with the aluminum nitride sintered bodies having a YAM (Y$_4$Al$_2$O$_9$) phase and a YAL (YAl$_3$) phase respectively. Accordingly, the aluminum nitride sintered body having a YAG phase at grain boundaries more easily meets the conditions of the grain boundary fracture toughness values according to the present invention.

Concerning the aluminum nitride sintered body having a YAG phase at grain boundaries, the ratio of a peak intensity of YAG at a (211) plane to a peak intensity of aluminum nitride at a (100) plane in an X-ray diffraction pattern, ($I_{YAG}/I_{AlN}$), may be 0.03 or more. In this case, the presence of a YAG phase more effectively improves the grain boundary fracture toughness of the aluminum nitride sintered body In addition, when the aluminum nitride sintered body of the present invention includes Si in the sintered body, the presence of Si enables a high grain boundary fracture toughness value to be achieved.

The aluminum nitride sintered body of the present invention may be obtained by being formed and fired using a raw mixed powder of aluminum nitride powder and at least one of yttria powder and silica powder. Alternatively, the aluminum nitride sintered body may be obtained by being formed and fired using a raw mixed powder of aluminum nitride powder and yttria powder alone, or of aluminum nitride powder, yttria powder and alumina powder. In these cases, it is easy to obtain an aluminum nitride sintered body having a YAG phase at grain boundaries or including Si in the sintered body.

Further, the aluminum nitride sintered body of the present invention may have an embedded electrode and may be used as an electrostatic chuck or a ceramic heater.

The first method of manufacturing the aluminum nitride sintered body of another aspect of the present invention includes: preparing a raw mixed powder in which yttria powder is included with a weight 0.5 to 1.4 times the weight of the amount of alumina calculated based on the amount of oxygen contained in the aluminum nitride powder; fabricating a compact by forming a body from the raw mixed powder; and firing the compact at 1700° C. to 1900° C.

Moreover, the second method of manufacturing the aluminum nitride sintered body of the another aspect of the present invention includes: fabricating a raw mixed powder in which aluminum nitride, yttria and alumina powders are mixed under conditions that the sum of the weights of the yttria and alumina powders and the weight of alumina calculated based on the amount of oxygen contained in the aluminum nitride powder is 2 to 20 parts by weight with respect to 100 parts by weight of the aluminum nitride powder, and that the ratio of the sum of the weight of the alumina powder and the weight of alumina calculated based on the amount of oxygen contained in the aluminum nitride powder, to the weight of the yttria powder, (alumina weight/yttria weight), is 0.5:1 to 1.4:1; fabricating a compact by forming a body from the raw mixed powder; and firing the compact at 1700° C. to 1900° C.

Further, the third method of manufacturing the aluminum nitride sintered body of the another aspect of the present invention includes: fabricating a raw mixed powder in which aluminum nitride, yttria and silica powders are mixed under conditions that the weight of the silica powder, or the sum of the weights of the yttria and silica powders, is 0.5 to 10 parts by weight with respect to 100 parts by weight parts of the aluminum nitride powder, and that the ratio of the weight of the yttria powder to the weight of the silica powder, (yttria weight/silica weight), is 0:1 to 30:1; fabricating a compact by forming a body from the raw mixed powder; and firing the compact at 1700° C. to 1900° C.

According to the above-described first to third method of manufacturing the aluminum nitride sintered body of the present invention, it is possible to manufacture an aluminum nitride sintered body which has a YAG phase at grain boundaries or includes Si in the sintered body, which has a grain boundary fracture toughness $K_{IC}{}^{gb}$ of 1.6 (MPa·m$^{1/2}$) or larger, and which is capable of effectively preventing grain dropping.

Note that, in the step of fabricating a compact in the method of manufacturing the aluminum nitride sintered body of the present invention, an electrode may be embedded in the compact to obtain an aluminum nitride sintered body which can be used as an electrostatic chuck or a ceramic heater.

Moreover, in the step of firing in the method of manufacturing the aluminum nitride sintered body of the present invention, hot press sintering may be performed. In this case, a metal bulk body can be used as an electrode to be embedded. Furthermore, it is possible to provide an aluminum nitride sintered body which exhibits good adhesion to the embedded electrode.

The method of evaluation for the aluminum nitride sintered body of the other aspect of the present invention is characterized by including: measuring the fracture toughness $K_{IC}$ (MPa·m$^{1/2}$) of the aluminum nitride sintered body; measuring the percentage of the intergranular fracture PIF (%); and determining the grain boundary fracture toughness $K_{IC}{}^{gb}$ using the measured fracture toughness $K_{IC}$ (MPa·m$^{1/2}$) and the percentage of the intergranular fracture PIF (%), based on the equation (1) below. Note that any of the fracture toughness and the percentage of the intergranular fracture may be measured first.

$$K_{IC}{}^{gb}=K_{IC}\cos^2(\pi \cdot PIF/200) \tag{1}$$

There is a high correlation of the grain boundary fracture toughness value with the intergranular crack frequency on which grain dropping of the aluminum nitride sintered body directly depends. In addition, there is a critical range where a predetermined grain boundary fracture toughness value is between 1.6 and 1.9 (MPa·m$^{1/2}$), and the intergranular crack frequency exhibits a tendency to dramatically decrease with an increased grain boundary fracture toughness value not less than the predetermined value. Accordingly, the grain boundary fracture toughness value can be used as an extremely effective evaluation index from the viewpoint of preventing grain dropping.

What is claimed is:

1. An aluminum nitride sintered body, comprising:
a polycrystalline aluminum nitride structure including Si and having grain boundaries, and including a YAG phase in the grain boundaries, the polycrystalline aluminum nitride having a grain boundary fracture toughness $K_{IC}{}^{gb}$ of 1.6 (MPa·m$^{1/2}$) or more, the grain boundary fracture toughness $K_{IC}{}^{gb}$ being represented by the following equation (1):

$$K_{IC}{}^{gb}=K_{IC}\cos^2(\pi \cdot PIF/200) \tag{1}$$

wherein $K_{IC}$ is fracture toughness (MPa·m$^{1/2}$), and PIF is a percentage of intergranular fracture (%).

2. The aluminum nitride sintered body according to claim 1, wherein the grain boundary fracture toughness $K_{IC}{}^{gb}$ is 1.9 (MPa·m$^{1/2}$) or more.

3. The aluminum nitride sintered body according to claim 1, wherein the polycrystalline aluminum nitride structure is fabricated by being formed and fired from a raw mixed powder obtained by mixing aluminum nitride powder with one of yttria powder alone and a combination of yttria powder and alumina powder.

4. The aluminum nitride sintered body according to claim 3, further comprising an electrode embedded in the polycrystalline aluminum nitride structure.

5. The aluminum nitride sintered body according to claim 4, wherein the aluminum nitride sintered body is one of an electrostatic chuck and a ceramic heater.

6. The aluminum nitride sintered body according to claim 1, further comprising an electrode embedded in the polycrystalline aluminum nitride structure.

7. The aluminum nitride sintered body according to claim 1, wherein the aluminum nitride sintered body is any one of an electrostatic chuck and a ceramic heater.

8. The aluminum nitride sintered body according to claim 1, wherein, in the polycrystalline aluminum nitride structure, a ratio of a peak intensity of a YAG crystal at a (211) plane to a peak intensity of an aluminum nitride crystal at a (100) plane in an X-ray diffraction pattern, ($I_{YAG}/I_{AlN}$), is 0.03 or more.

9. The aluminum nitride sintered body according to claim 1, wherein the polycrystalline aluminum nitride structure is fabricated by being formed and fired from a raw mixed powder obtained by mixing aluminum nitride powder with at yttria powder and silica powder.

10. The aluminum nitride sintered body according to claim 9, further comprising an electrode embedded in the polycrystalline aluminum nitride structure.

11. The aluminum nitride sintered body according to claim 10, wherein the aluminum nitride sintered body is one of an electrostatic chuck and a ceramic heater.

* * * * *